United States Patent
Sylvester

(10) Patent No.: US 8,112,186 B2
(45) Date of Patent: Feb. 7, 2012

(54) METHOD AND APPARATUS FOR MANAGING FLIGHT PLANNING

(75) Inventor: Tim Sylvester, Albany, OR (US)

(73) Assignee: The Boeing Company, Chicago, IL (US)

( * ) Notice: Subject to any disclaimer, the term of this patent is extended or adjusted under 35 U.S.C. 154(b) by 1273 days.

(21) Appl. No.: 11/762,278

(22) Filed: Jun. 13, 2007

(65) Prior Publication Data

US 2008/0312776 A1    Dec. 18, 2008

(51) Int. Cl.
    *G06F 17/00*    (2006.01)
(52) U.S. Cl. ............................ 701/3; 340/971
(58) Field of Classification Search ................ 701/3, 15, 701/16, 7, 11, 14; 340/971, 973, 500; 244/175, 244/195, 75.1, 183
    See application file for complete search history.

(56) References Cited

U.S. PATENT DOCUMENTS

| | | | |
|---|---|---|---|
| 4,642,775 A * | 2/1987 | Cline et al. | 701/200 |
| 5,006,829 A * | 4/1991 | Miyamoto et al. | 340/459 |
| 6,038,498 A * | 3/2000 | Briffe et al. | 701/3 |

* cited by examiner

*Primary Examiner* — Dalena Tran
(74) *Attorney, Agent, or Firm* — Yee & Associates, P.C.

(57) ABSTRACT

A computer implemented method, apparatus, and computer usable program code for displaying flight plan data. First level flight plan data is displayed and user input is received selecting a selection of a portion of the first level flight plan data. In response to receiving the selection of the portion of the first level flight plan data, second level flight plan data is displayed, wherein the second level flight plan data displayed is used to derive the selected portion of the first level flight plan data selected by the user input.

14 Claims, 8 Drawing Sheets

800

| | | |
|---|---|---|
| 402 • FUEL REMAINING | = 406 INITIAL FUEL (2165 Gal) - TAKEOFF FUEL (18 Gal) - LEG FUEL (83.73 Gal) | = 2063.27 Gal |
| 502 • INITIAL FUEL | = 512 RAMP FUEL (2200 Gal) - TAXI FUEL (35 Gal) | = 516 2165 Gal |
| 602 • RAMP FUEL | = 610 (FROM FLIGHT PLAN WIZARD) | = 606 2200 Gal |
| 604 • TAXI FUEL | = 612 (FROM AIRCRAFT SETUP) | = 608 35 Gal |
| 504 • TAKEOFF FUEL | = 516 (FROM AIRCRAFT SETUP) | = 510 18 Gal |
| 506 • LEG FUEL | = 518 ETE (8.13 min) - FUEL BURN RATE (617.917 Gal/Hour) | = 512 83.73 Gal |
| 702 • ETE | = 708 LEG DISTANCE (49.322 NM) GROUND SPEED (364 Kts) | = 706 8.13 min |
| 802 • LEG DISTANCE | = 808 COMPUTED BY GEODETIC MODEL | = 606 49.4014 NM |
| 804 • GROUND SPEED | = 812 (COMPUTED BY AIRCRAFT PERFORMANCE MODEL) | = 610 364 Kts |
| 704 • FUEL BURN RATE | = 712 (COMPUTED BY AIRCRAFT PERFORMANCE MODEL) | = 716 617.917 Gal/Hour |

| | | |
|---|---|---|
| 402 • FUEL REMAINING | = 406 INITIAL FUEL (2165 Gal) - TAKEOFF FUEL (18 Gal) - LEG FUEL (83.73 Gal) | = 404 2063.27 Gal |
| 502 • INITIAL FUEL | = 514 RAMP FUEL (2200 Gal) - TAXI FUEL (35 Gal) | = 508 2165 Gal |
| 602 • RAMP FUEL | = 616 (FROM FLIGHT PLAN WIZARD) | = 606 2200 Gal |
| 604 • TAXI FUEL | = 612 (FROM AIRCRAFT SETUP) | = 608 35 Gal |
| 504 • TAKEOFF FUEL | = (FROM AIRCRAFT SETUP) | = 510 18 Gal |
| 506 • LEG FUEL | = 518 ETE (8.13 min) - FUEL BURN RATE (617.917 Gal/Hour) | = 512 83.73 Gal |
| 702 • ETE | = 708 LEG DISTANCE (49.322 NM) GROUND SPEED (364 Kts) | = 706 8.13 min |
| 802 • LEG DISTANCE | = 808 COMPUTED BY GEODETIC MODEL | = 806 49.4014 NM |
| • INITIAL LOCATION | = KBOS RW22L END POINT (FROM FLIGHT PLAN) | = N 42° 21' 14.53" / W 071° 00' 37.24" |
| • INITIAL ALTITUDE | = KBOS RW22L END POINT (FROM FLIGHT PLAN) | = 327 ft MSL |
| • FINAL LOCATION | = PVD (PROVIDENCE VORTAC) (FROM FLIGHT PLAN) | = N 41° 43' 27.66" / W 071° 25' 46.68" |
| • FINAL ALTITUDE | = (FROM FLIGHT PLAN) | = 17343 ft MSL |

FROM FIG. 9A

804 — • GROUND SPEED = 910 (COMPUTED BY AIRCRAFT PERFORMANCE MODEL) = 810 364 Kts

904 {
- AIRCRAFT = (FROM FLIGHT PLAN) = CESSNA CITATION X (TAIL #N123)
- AIRCRAFT WEIGHT = (FROM AIRCRAFT MODEL) = 34988 lbs
- INITIAL ALTITUDE = KBOS RW22L ELEVATION (FROM FLIGHT PLAN) = 19 ft MSL
- FINAL ALTITUDE = (FROM FLIGHT PLAN) = 17343 ft MSL
- POWER SETTING = (FROM FLIGHT PLAN) = "300 KIAS/ .80 IN MACH"
- TEMPERATURE = (FROM FLIGHT PLAN) = 0C
- PRESSURE = (FROM FLIGHT PLAN) = 29.921 inHg 704 — • FUEL BURN RATE = 712 (COMPUTED BY AIRCRAFT PERFORMANCE MODEL) = 710 617.917 Gal/Hour 906 {
- AIRCRAFT = (FROM FLIGHT PLAN) = CESSNA CITATION X (TAIL #N123)
- AIRCRAFT WEIGHT = (FROM AIRCRAFT MODEL) = 34988 lbs
- INITIAL ALTITUDE = KBOS RW22L ELEVATION (FROM FLIGHT PLAN) = 19 ft MSL
- FINAL ALTITUDE = (FROM FLIGHT PLAN) = 17343 ft MSL
- POWER SETTING = (FROM FLIGHT PLAN) = "300 KIAS/ .80 IN MACH"
- TEMPERATURE = (FROM FLIGHT PLAN) = 0C
- PRESSURE = (FROM FLIGHT PLAN) = 29.921 inHg

*FIG. 9B*

METHOD AND APPARATUS FOR MANAGING FLIGHT PLANNING

BACKGROUND INFORMATION

1. Field

The present disclosure relates generally to an improved data processing system and in particular to a method and apparatus for processing data. Still more particularly, the present disclosure relates to a computer implemented method, apparatus, and computer usable program code for managing flight planning calculations.

2. Background

A flight plan is created during a planning process and is followed by an aircraft during flight from a departure point to a destination point. The flight plan is required to be filed with the appropriate authorities prior to the aircraft actually flying from the departure point to the destination point. Important aspects of a flight plan include, for example, fuel calculations and compliance with air traffic control requirements. A correct fuel calculation ensures that the aircraft can safely reach the destination. A flight plan that complies with air traffic control requirements is important to minimize the risk of mid-air collisions. Other risks that may be minimized by a flight plan include running out of fuel if divert or weather conditions dictate an alternate route. Further, considerations, such as minimizing flight costs by appropriate choice of route, height, speed, and loading the minimum required fuel, including a reserve amount, on the aircraft, may be taken into account in creating a flight plan.

In performing fuel calculations, many different factors are taken into consideration. For example, accurate weather forecasts and conditions are factored into full fuel calculations. Fuel consumption calculations may vary due to effects caused by factors, such as head winds or tail winds. Other considerations for fuel consumption calculations include routes, flight levels, and the fuel consumption rate of the aircraft's engines. Further, safety regulations also require that an aircraft carry reserve fuel for unforeseen situations. Typical methods for calculating the amount of reserve fuel include having enough fuel to circle around the destination for some selected amount of time.

Further, in fuel calculations, cost factors also are taken into account based on time, fuel, a balance between time and fuel, or fuel costs. A flight planning program may often help produce this cost by finding the most economical speed given a particular set of conditions.

With a fuel planning application, a user may select an aircraft model from a library of existing models. The selection of the model helps accurately estimate different aspects of the flight plan, such as fuel usage, climb speeds, and descent speeds. Further, a user may change default properties or change selected properties to the default aircraft to fit the actual properties of the aircraft for which the fuel planning is being performed. Often values, such as for fuel flow for any given leg of a flight, are either a guess or estimate made by the pilot or dispatcher or are taken from a standard table for a particular model of an aircraft.

Given flight safety concerns and fuel costs, the ability to accurately tune the flight profile becomes increasingly important. The tuning or refining of a flight profile is a particular concern if an aircraft is required to deviate from a flight plan because of bad weather at the primary airport. Such an unexpected increase or decrease in fuel may have an impact on traveling to an alternate airport.

The flight plan is typically the result of many detailed computations involving other underlying data. This underlying data may come from published data about airports, navigation aids, aircraft performance models, weather observations, weather predictions, or direct inputs from the user. The flight plan is presented to the user at a display and the user may observe an apparent error in the data field in the results. It is currently difficult for the user to determine the actual source of the error because the complexity of the computations is hidden from the user in currently available applications.

Current paper forms or automated software applications used to generate flight plans only give the pilot, dispatcher, or other user's limited access to several inputs that impact the flight plan. Consequently, users often change readily editable values to create the correct end result that the user expects. The change in these values do not necessarily reflect actual values for the inputs being changed, but are made to obtain a result that the user expects for a particular flight.

The user may try changing input values to determine the effect on the output data values. The user may change these values to obtain the expected output data values. This type of process may be problematic because some changes modify flight plan values immediately while others only do so after the plan is recomputed. Further, with some flight plan products, the pilot may modify two different instances of the same aircraft with different results. As a result, changes made by the user may not accurately reflect actual fuel consumption due to a particular route entered by a user.

SUMMARY

The different advantageous embodiments provide a computer implemented method, apparatus, and computer usable program code for displaying flight plan data. First level flight plan data is displayed and user input is received selecting a selection of a portion of the first level flight plan data. In response to receiving the selection of the portion of the first level flight plan data, second level flight plan data is displayed, wherein the second level flight plan data displayed is used to derive the selected portion of the first level flight plan data selected by the user input.

Other advantageous embodiments provide a computer usable medium having computer usable program code for displaying flight plan data. Computer usable program code is present for receiving user input for a selection of a portion of the first level flight plan data. The computer usable medium has computer usable program code for displaying second level flight plan data in response to receiving the selection of the portion of the first level flight plan data, wherein the second level flight plan data displayed is used to derive the selected portion of the first level flight plan data selected by the user input Another advantageous embodiment includes a data processing system comprising a bus, a communications unit connected to the bus, a storage device connected to the bus, in which the storage device includes a computer usable program code, and a processor unit connected to the bus. The processor unit executes the computer usable program to display first level flight plan data; receive user input selecting a selection of a portion of the first level flight plan data; and display second level flight plan data in response to receiving the selection of the portion of the first level flight plan data, wherein the second level flight plan data displayed is used to derive the selected portion of the first level flight plan data selected by the user input.

The features, functions, and advantages can be achieved independently in various embodiments of the present invention or may be combined in yet other embodiments in which further details can be seen with reference to the following description and drawings.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an advantageous embodiment of the present invention when read in conjunction with the accompanying drawings, wherein:

FIG. 8 is a diagram illustrating a display of multiple levels of flight plan data in accordance with an advantageous embodiment;

FIGS. 9A and 9B are a diagram illustrating another display of multiple levels of flight plan data in accordance with an advantageous embodiment.

DETAILED DESCRIPTION

Figure 1:
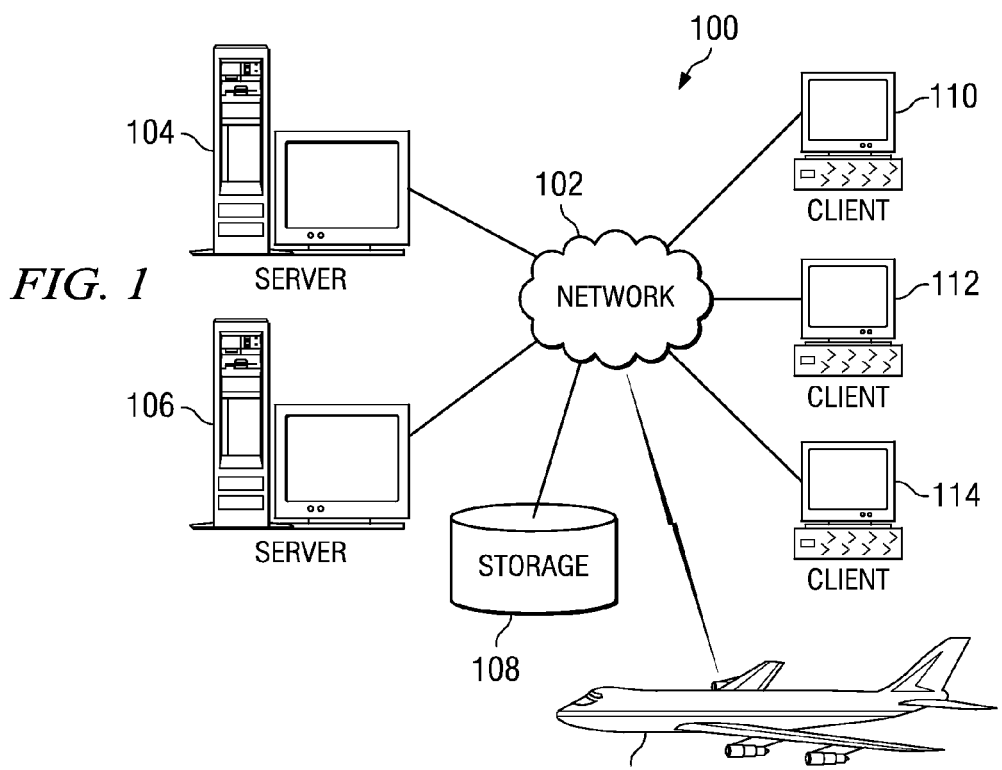
FIG. 1 is a pictorial representation of a network of data processing systems in which the advantageous embodiments may be implemented.
Figure 2:
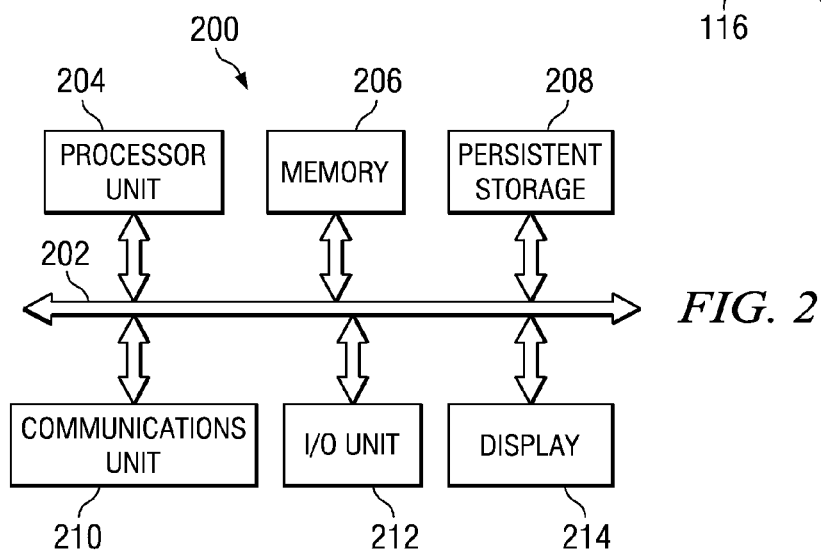
FIG. 2 is a diagram of a data processing system in accordance with an illustrative embodiment.

With reference now to the figures and in particular with reference to FIGS. 1-2, exemplary diagrams of data processing environments are provided in which the advantageous embodiments of the present invention may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which the advantageous embodiments of the present invention may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. In these examples, server 104, server 106, client 110, client 112, and client 114 may be computers in an airport or network of airports in which servers 104 and 106 contain processes and/or data by the clients to generate flight plans. Some clients may operate in a standalone mode using locally operating applications to generate flight plans without need to connection to network 102. Network data processing system 100 may include additional servers, clients, and other devices not shown.

Additionally, aircraft 116 also may receive information from server 104 or 106 through a wireless communications link (in-flight) or any other data link on the ground. Flight planning for aircraft 116 may be updated in a dynamic mode as conditions, such as weather conditions and waiting times, change.

In the depicted example, network data processing system 100 is the Internet with network 102 representing a worldwide collection of networks and gateways that use the Transmission Control Protocol/Internet Protocol (TCP/IP) suite of protocols to communicate with one another. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

Turning now to FIG. 2, a diagram of a data processing system is depicted in accordance with an illustrative embodiment of the present invention. Data processing system 200 is an example of a data processing system that may be used to implement servers and clients, such as server 104 and client 110. Further, data processing system 200 is an example of a data processing system that may be found in aircraft 116. Data processing system may execute software for flight planning processes in accordance with advantageous embodiments in the present disclosure.

In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. Memory 206, in these examples, may be, for example, a random access memory. Persistent storage 208 may take various forms depending on the particular implementation. For example, persistent storage 208 may be, for example, a hard drive, a flash memory, a rewritable optical disk, a rewritable magnetic tape, or some combination of the above.

Communications unit 210, in these examples, provides for communications with other data processing systems or devices. In these examples, communications unit 210 is a network interface card. I/O unit 212 allows for input and output of data with other devices that may be connected to data processing system 200. For example, I/O unit 212 may provide a connection for user input though a keyboard and mouse. Further, I/O unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as communications fabric 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a personal digital assistant (PDA).

The different advantageous embodiments recognize that a flight plan is a result of detailed computations. A pilot may not necessarily understand these computations, but may recognize when a problem exists with one of the values.

For example, a pilot, dispatcher, or other user may find that the total time in route or fuel consumption for a flight plan is different than what is actually observed. This difference may be noticed when comparing the flight plan to an actual completed flight. The difference also may be noticed when comparing the flight plan to the user's general experience with a regular and well known trip.

The different advantageous embodiments recognize that having observed such a difference, the current methods and applications for flight planning make it difficult for a pilot or user to determine the root cause of difference in values in a flight plan. The documentation for currently available flight planning applications may include a short summary of the field in question, but the pilot may not find or understand this explanation.

Alternatively, the explanation may not be detailed enough for the pilot. The task of refining flight plans and aircraft models to more closely model actual flight performance generally devolves to changing values at random to discover the effect on output values.

This type of input is more problematic because some changes modify the flight plan values immediately, while other changes modify the flight plan only after the plan is recomputed. As a result, accurately identifying the effects of changes may be difficult without recomputing the entire plan each time. Further, with some applications, a user may modify two different instances of the same aircraft with different results.

Thus, the different advantageous embodiments provide a computer implemented method, apparatus, and computer usable program code for displaying flight plan data. First level flight plan data is displayed. A selection of a portion of the first level flight plan data may be received to form a selected portion of the first level flight plan data. In response to receiving a selection of the selected portion of the first level flight plan data, second level flight plan data is displayed. This second level flight plan data that is displayed is used to derive the selected portion of the first level flight plan data.

The different advantageous embodiments include an ability to present information about how selected values are derived. Further, the different advantageous embodiments also allow a user to change these values in a manner that the changes to other values derived from the changed values are updated automatically without having to recalculate the entire flight plan.

Figure 3:
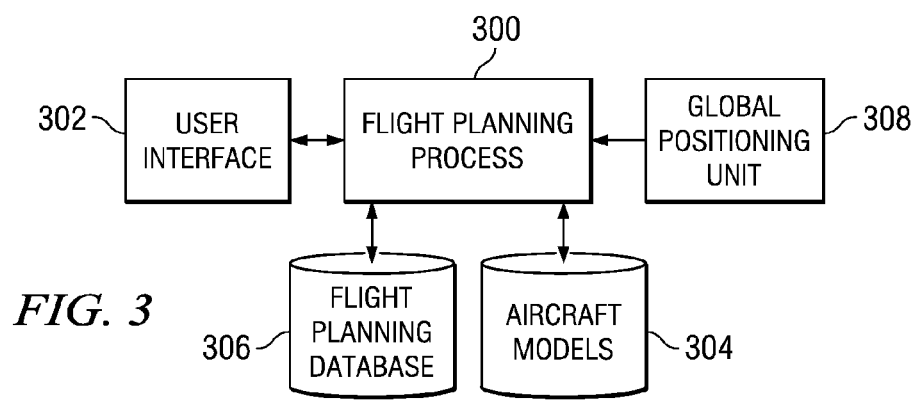
FIG. 3 is a diagram illustrating components used in presenting flight plan data in accordance with an advantageous embodiment.

Turning now to FIG. 3, a diagram illustrating components used in presenting flight plan data is depicted in accordance with an advantageous embodiment. In this example, flight planning process 300 generates flight plans based on user input received at user interface 302. In these examples, user interface 302 is a graphical user interface through which a user may generate a flight plan and see the output from selected inputs.

The user may select an aircraft model from aircraft models 304 to begin the flight planning process. Additionally, data is collected from flight planning database 306 to generate the flight plan. Flight planning database 306 may include one or more databases located in the same or different geographic locations. These databases provide information about current weather conditions and predicted weather conditions. Further, flight planning database 306 also includes information about airports. For example, based on a selected departure and destination airport, information as to approaches and taxiing information may be derived for use by flight planning process 300 in generating a flight plan.

Once a flight plan has been created, flight planning process 300 presents the flight plan through user interface 302. In these examples, flight planning process 300 may be executed on a stand-alone system, such as client 110 in FIG. 1 and access information located on other systems, such as server 106 in FIG. 1. In these examples, the flight plan is generated prior to the flight actually taking place and is filed to obtain approval for the flight.

Depending on the particular implementation, flight planning process 300 also may dynamically update a flight plan based on the aircraft's current location. In this type of implementation, flight planning process 300 may execute on a data processing system, such as data processing system 200 in FIG. 2, located on an aircraft, such as aircraft 116 in FIG. 1. Global positioning unit 308 may provide location and movement information about the aircraft.

When implemented on an aircraft, such as aircraft 116 in FIG. 1, flight planning process 300 may dynamically change the flight plan as the flight from a departure point to a destination point progresses. In this manner, changes in fuel burn and weather conditions may be used to show the final fuel consumption that is expected during a portion of the flight.

In addition to presenting values through user interface 302, flight planning process 300 allows a user to select a particular value that has been displayed to view details on how that selected value was derived. The values first displayed by flight planning process 300 on user interface 302 when a flight plan is generated are referred to as first level flight plan data in these examples.

By receiving user input through user interface 302 and selecting a particular value, a portion of the first level flight plan data may be selected by a user. In response to the user input, flight planning process 300 identifies the values to generate this selected value. These identified values are part of the second level flight plan data. The identified second level flight plan data is displayed on user interface 302 for the user to view. In addition to displaying values, user interface 302 also presents explanations, such as the calculations or equations used with the values so that the user can understand how the selected value was derived.

The user may see additional levels of detail by selecting a value from the second level flight plan data. This selected portion of the second level flight plan data results in flight planning process 300 identifying values used to generate the selected portion of the second level flight planning data. These identified values are the third level flight plan data in the depicted examples. These values are presented to a user on user interface 302 along with details on how the values were derived in these illustrative embodiments.

In this manner, a user may see values at different levels of detail. The user may change specific values based on the user's knowledge of actual conditions to see how these values affect the upper level flight plan data derived from the changed values. These types of changes are calculated dynamically or automatically without requiring the user to go back and recompute the entire flight plan.

Figure 4:
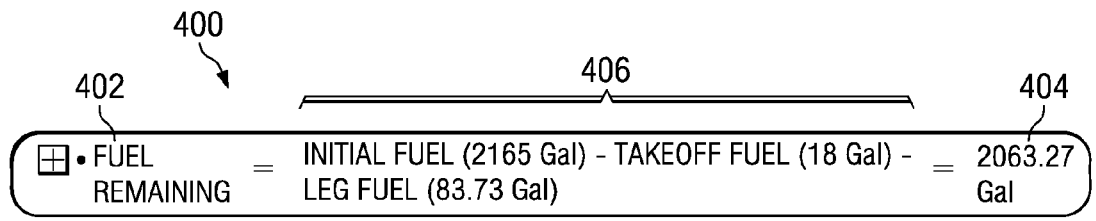
FIG. 4 is a diagram of a display of first level flight plan data in accordance with an advantageous embodiment.

Turning now to FIG. 4, a diagram of a display of first level flight plan data is depicted in accordance with an advantageous embodiment. In this example, display 400 is an example of a display presented through a user interface, such as user interface 302 in FIG. 3. Display 400 presents the flight planning information in a tree structure or architecture in which different nodes may be selected to present information related to those nodes on a lower level in the tree.

In this particular example, display 400 includes a node for fuel remaining 402. As can be seen, fuel remaining 402 includes value 404 as well as an explanation in section 406. Value 404 is the fuel remaining. In these examples, the fuel remaining is derived from the initial fuel minus the takeoff fuel minus the leg fuel as shown in section 406. As can be seen, value 404 is presented in association with a description of this value.

In these illustrative examples, the flight plan information presented in display 400 is presented using a tree hierarchy or structure. In other words, a user may select fuel remaining 402 to see additional related information in nodes that are located in the level below fuel remaining 402. In particular, a user may select fuel remaining 402 to display second level flight plan data. Further, the flight plan displayed on display 400 includes additional information not shown in this example. Only fuel remaining 402 is shown for purposes of illustrating the different features in the advantageous embodiments. Other values and explanations are not shown to avoid obscuring the explanation of these features.

Figure 5:
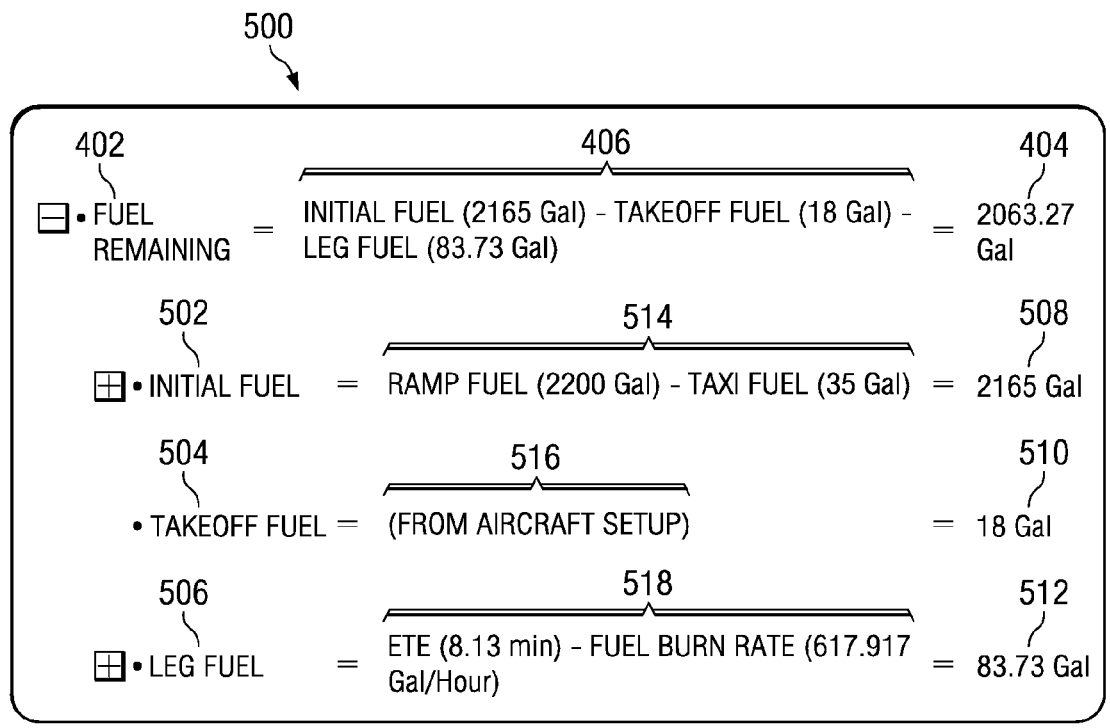
FIG. 5 is a diagram illustrating a display of first level flight plan data and second level flight plan data in accordance with an advantageous embodiment.

Turning now to FIG. 5, a diagram illustrating first level flight plan data and second level flight plan data is depicted in accordance with an advantageous embodiment. In this example, the user has selected fuel remaining 402. By selecting this node, additional related nodes in the tree are presented in display 500. These related nodes are for values used to derive fuel remaining 402. The flight planning process identifies second level flight plan data used to generate the first level flight plan data in fuel remaining 402. The second level flight plan data is displayed as initial fuel 502, takeoff fuel 504, and leg fuel 506.

In these examples, initial fuel 502, takeoff fuel 504, and leg fuel 506 are nodes that branch off of fuel remaining 402. As can be seen with this second level flight plan data, each of these components is displayed with a value. Initial fuel 502 is displayed in association with value 508, takeoff fuel 504 is displayed in association with value 510, and leg fuel 506 is displayed in association with value 512.

The manner in which these values are derived are illustrated in sections 514 and 518. Initial fuel 502 and leg fuel 506 are derived from additional flight plan data as shown in section 514, 516, and 518. Takeoff fuel 504 is derived from the aircraft setup as shown in section 516. Initial fuel 502 and leg fuel 506 include explanations as to how these values were derived in sections 514 and 518. For example, initial fuel 502 has value 508 that is generated by subtracting taxi fuel from the ramp fuel in section 514. Leg fuel 506 has value 512, which is derived by subtracting fuel burn rate from estimated time en route (ETE). No additional details are present for takeoff fuel 504 in this example. A user may select initial fuel 502 and/or leg fuel 506 to display additional lower levels of flight planning detail.

Figure 6:
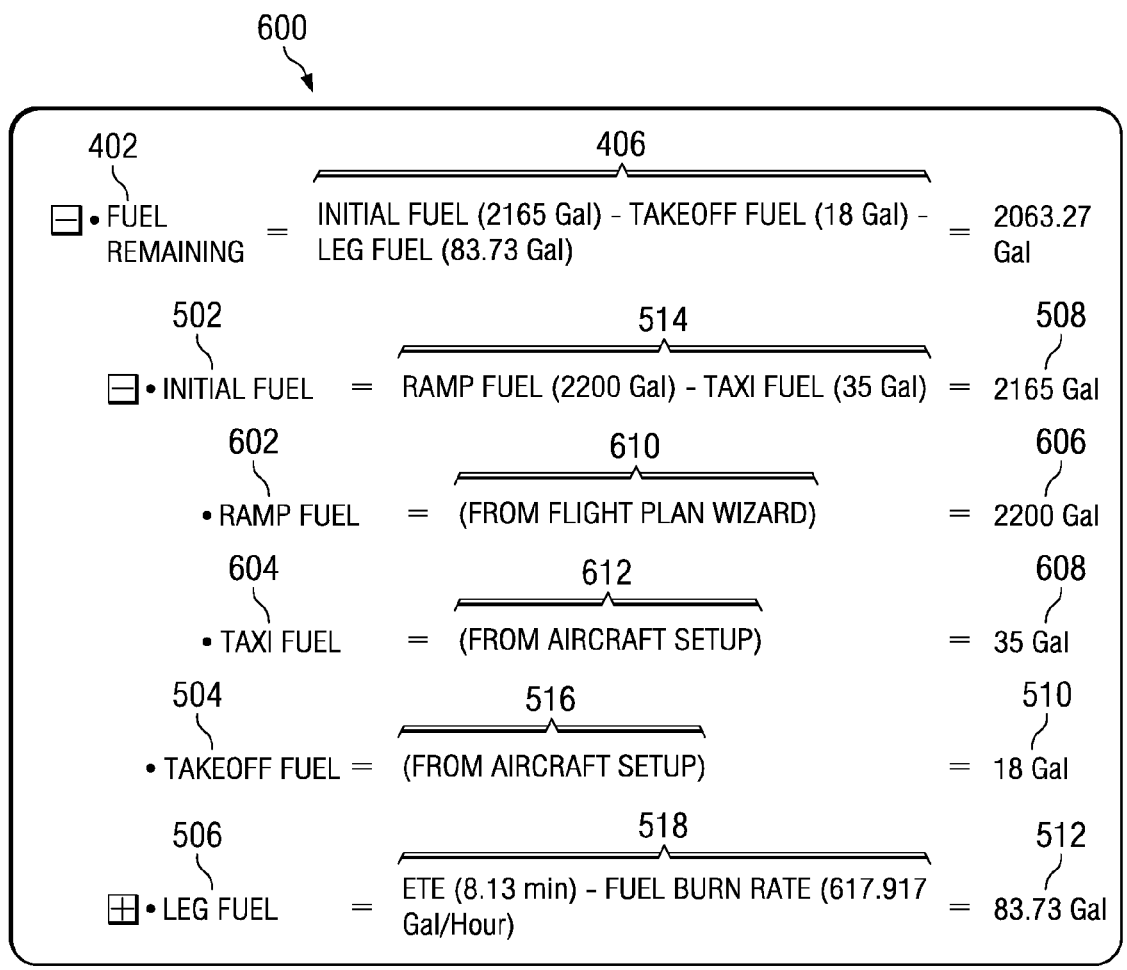
FIG. 6 is an example of a display that may be presented in a user interface in accordance with an advantageous embodiment.

Turning now to FIG. 6, an example of a display that may be presented in a user interface in accordance with an advantageous embodiment. Display 600 is an example of a display that may be presented in a user interface, such as user interface 302 in FIG. 3. In this example, the user has selected initial fuel 502. As a result, third level flight plan data is identified for initial fuel 502. In this example, the third level flight plan data includes ramp fuel 602 and taxi fuel 604. These two portions of third level flight plan data are nodes in the tree. Values 606 and 608 are displayed in association with explanations in sections 610 and 612 for these nodes, respectively.

Figure 7:
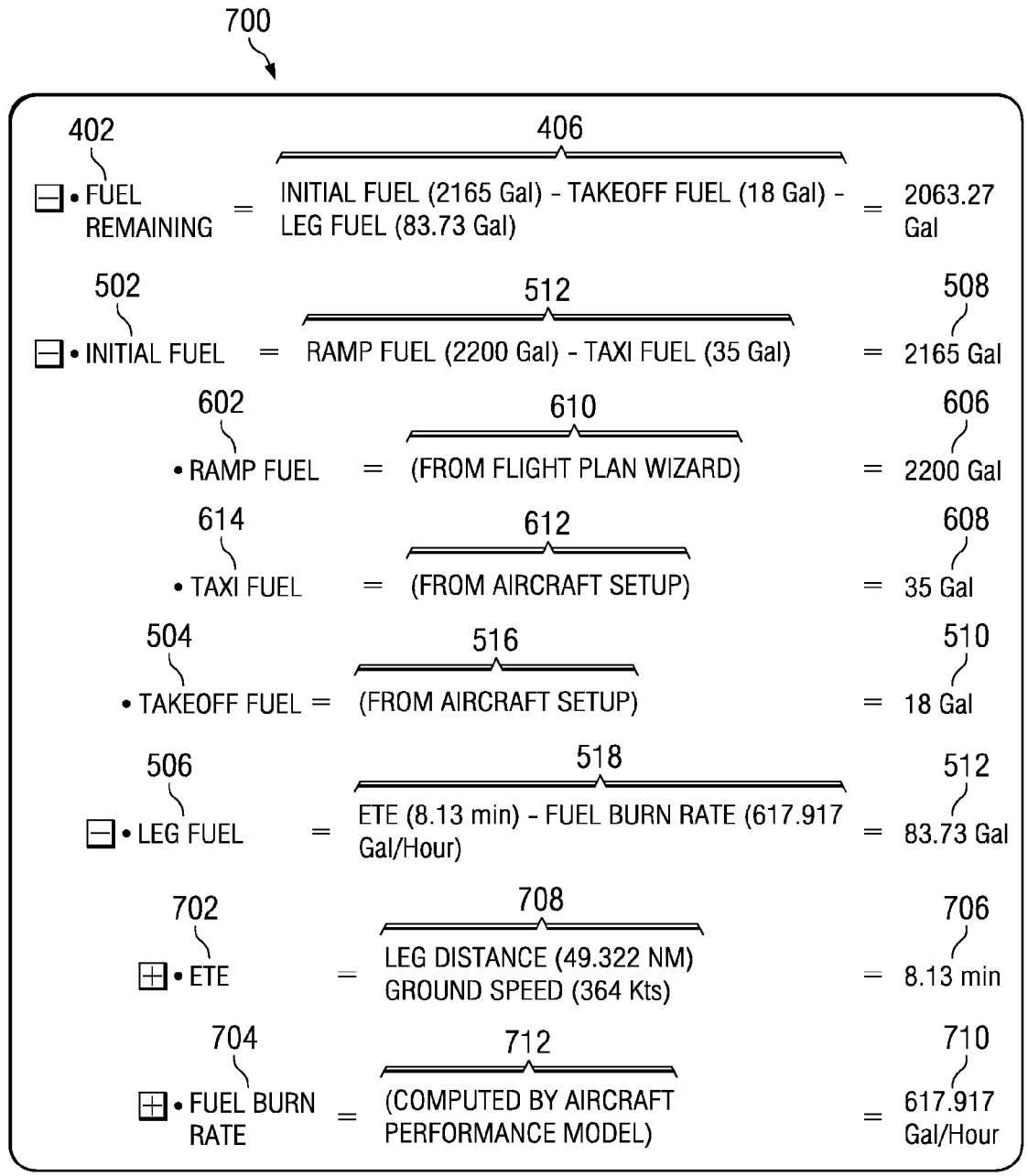
FIG. 7 is a diagram illustrating a display of multiple levels of flight planning data in accordance with an advantageous embodiment.

Turning now to FIG. 7, a diagram illustrating a display of multiple levels of flight planning data is depicted in accordance with an advantageous embodiment. In this example, display 700 is an example of a display presented through a user interface, such as user interface 302 in FIG. 3. In this example, the user has selected the node leg fuel 506, resulting in forth level flight plan data being presented. The forth level flight plan data includes ETE 702 and fuel burn rate 704. In a similar fashion, ETE 702 is displayed in association with value 706 and an explanation in section 708. Fuel burn rate 704 is displayed with value 710 along with an explanation in section 712.

With reference now to FIG. 8, a diagram illustrating a display of multiple levels of flight plan data is depicted in accordance with an advantageous embodiment. Display 800 is an example of a display that may be presented through a user interface, such as user interface 302 in FIG. 3.

In this example, display 800 is presented in response to a user selecting ETE 702. In response to a selection of this portion of fourth level flight plan data, fifth level flight plan data is displayed. In this example, the fifth level flight plan data includes leg distance 802 and ground speed 804. Leg distance 802 is displayed with value 806 in association with an explanation in section 808. Ground speed 804 is displayed with value 810 in association with an explanation in section 812.

With reference to FIGS. 9A and 9B, a diagram illustrating multiple levels of flight plan data is depicted in accordance with an advantageous embodiment. In this example, display 900 is an example of a display generated for user interface 302 in FIG. 3. In this example, fifth level flight plan data is displayed in response to a selection of leg distance 802 and ground speed 804 in sections 902 and 904. Fourth level flight plan data is displayed in response to a selection of fuel burn rate 704 in section 906.

As can be seen in the different illustrative examples in FIGS. 4-9, multiple levels of flight plan data may be displayed to the user. In each instance, a value, as well as an explanation as to how the value was derived, is provided. A selection of the particular portion of the flight plan data results in a lower level of flight plan data being displayed to the user in these examples. This lower level flight plan data displays one or more values along with explanations of those values. The user may see more detail depending on the amount of detail present. Further, depending on the particular implementation, some types of detail may be hidden from the user.

With each of these levels of flight plan data, the user may alter some of the displayed values. In response to altering the displayed values, the flight planning process recalculates all of the upper level flight plan data that is used or is derived directly or indirectly from the changed value. As a result, a user may see changes immediately without having to recalculate the entire flight plan. By seeing the different explanations for the values in this type of user interface, a user may more intelligently select values to be changed, rather than changing values to see how those values effect the first level flight plan data.

Figure 10:
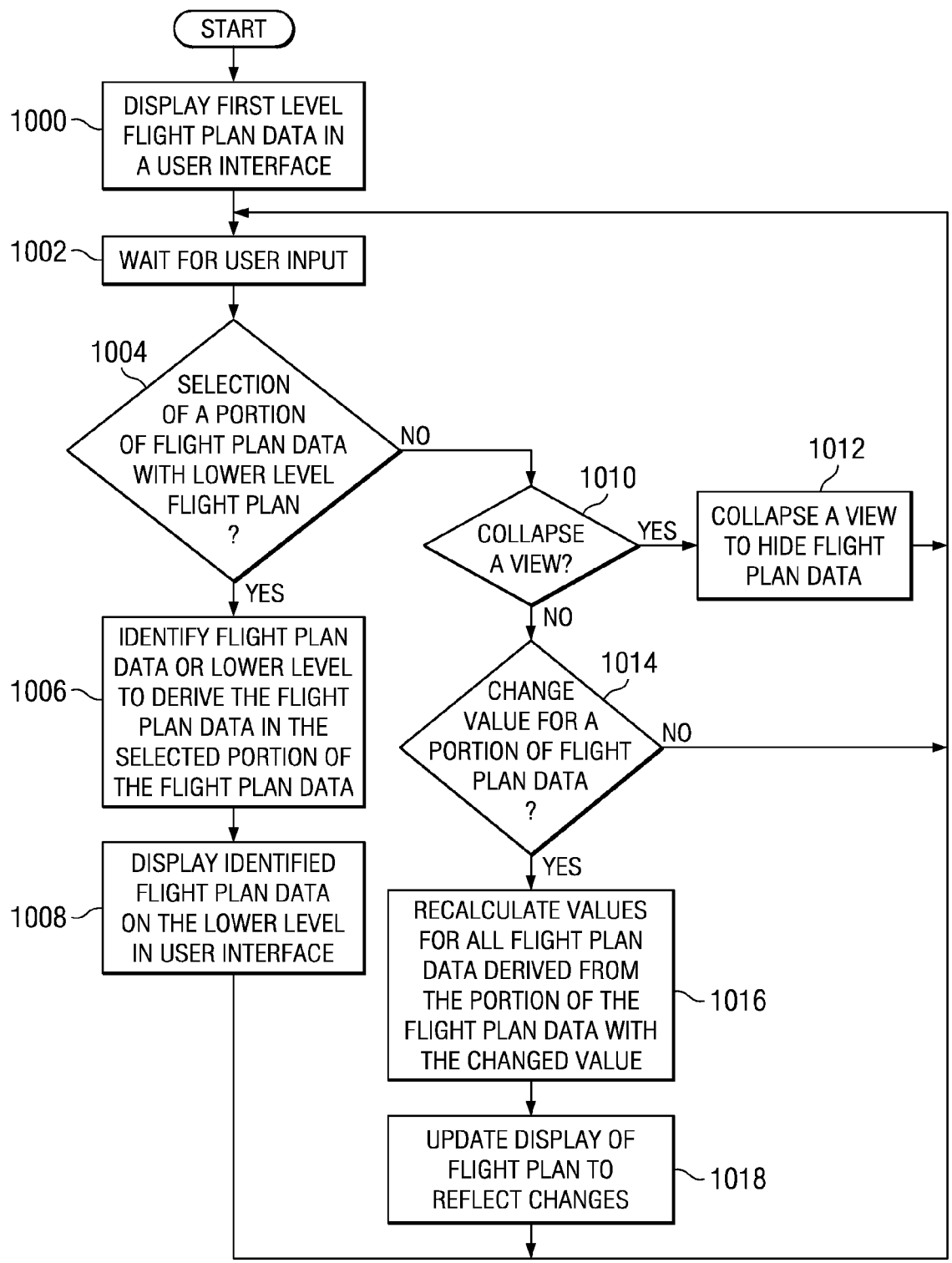
FIG. 10 is a flowchart of a process for displaying flight plan data in accordance with an advantageous embodiment.

With reference now to FIG. 10, a flowchart of a process for displaying flight plan data is depicted in accordance with an advantageous embodiment. The process illustrated in FIG. 10 may be implemented in a flight planning process, such as flight planning process 300 in FIG. 3. The process illustrated in FIG. 10 illustrates the different operations that are performed to present a display, such as those illustrated in FIGS. 4-9.

The process begins by displaying a first level flight plan data in a user interface (operation 1000). The display of user interface information in operation 1000 is similar to the display presented in display 400 in FIG. 4. Thereafter, the process waits for user input (operation 1002). When user input is received, a determination is made as to whether the user input is a selection of a portion of the flight plan data that has lower flight plan data (operation 1004). If the selected portion of the flight plan data has been selected that has lower flight plan data, the process identifies the flight plan data on the lower level used to derive the flight plan data in the selection portion of the flight plan data in the upper level (operation 1006).

Next, the process displays the identified flight plan data on the lower level in the user interface (operation 1008). The display of flight plan data in operation 1008 is similar to the display presented in display 500 in FIG. 5.

Afterwards, the process returns to operation 1002 to wait for further user input. The process may continue to loop through operations 1004, 1006, and 1008 if the user continues to select portions of flight level data on lower levels that have additional flight plan data on even lower levels.

With reference again to operation 1004, if the user input is not a selection of the portion of flight plan data with lower level flight plan data, a determination is made as to whether the user has selected to collapse a view in the display (operation 1010). If the user has decided to collapse a view, the view is collapsed to hide the flight plan data selected by the user (operation 1012) with the process then returning to operation 1002 as described above.

In this manner, the user may hide portions of the flight plan data to simplify the view. For example, as in display 900 in FIG. 9A, large amount of flight plan data at five different levels of flight plan data are illustrated. The user may choose to collapse or hide some of the different portions of the flight plan data to simplify the data being reviewed by the user.

With reference again to operation 1010, if the user input is not selection to collapse a view, a determination is made as to whether the user input changes a value for a portion of the flight plan data (operation 1014). If the user input changes a value for a portion of flight plan data, the process recalculates values for all flight plan data derived from the portion of the flight plan data with the changed value (operation 1016). For example, if the user selects to change a value on a fifth level of flight plan data, this change in value affects flight plan data all the way up to the first level of flight plan data. This change in the value on the fifth level of flight plan data may also be reflected in other parts of the tree structure besides direct ancestor elements that are derived from the changed value. For example, the same value may be used for multiple legs of the flight plan (as in the aircraft's cruise speed), or subsequent legs may be dependent on the result in the current leg. The current leg's "Fuel Remaining," for example, is used as the "Initial Fuel" on the next leg of the route. In other words, the change in the value on one level of flight plan data may cause changes in many different levels of flight plan data that may or may not be directly derived from the changed value. As a result, the change in the value is reflected in flight plan data that relies on the changed value directly or indirectly.

Thereafter, the display of the flight plan data is updated to reflect the changes (operation 1018). The process then returns to operation 1002 as described above. With reference again to operation 1014, if the user input does not change a value for a portion of the flight plan data, the process returns to operation 1002 as described above.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

Thus, the different advantageous embodiments provide a computer implemented method, apparatus, and computer usable program code for displaying flight plan data. In the different embodiments, first level flight plan data is received. A selection of the portion of flight plan data may be selected to form a selected portion of the first level flight plan data. In response to receiving the selection of the selected portion of the first level flight plan data, second level flight plan data is displayed. The second level flight plan data displayed is flight plan data used to derive the selected portion of the first level flight plan data.

Additionally, different embodiments in the present disclosure may receive a change to a portion of the second level flight plan data. In response to receiving this change, the selected portion of the first level flight plan data derived from changes to the portion of the second level flight plan data are updated to form an updated portion of the first level flight plan data. This updated portion of the first level flight plan data is then presented.

Further, although the depicted examples illustrate different levels of flight plan data with fuel remaining as the first level flight plan data, the different embodiments may apply to many other types of flight plan data. Examples include magnetic course/heading (wind correction angle), ground speed and true air speed, estimated time en route (ETE) and estimated time of arrival (ETA), and climb and descent angles.

The description of the present disclosure has been presented for purposes of illustration and description, and is not intended to be exhaustive or limited to the invention in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the disclosure, the practical application, and to enable others of ordinary skill in the art to understand the invention for various embodiments with various modifications as are suited to the particular use contemplated.

What is claimed is:

1. A computer implemented method for displaying flight plan data, the computer implemented method comprising:
   displaying first level flight plan data comprising a value, a calculation to derive the value, and a description of the value for the first level flight plan data;
   receiving user input for a selection of a portion of the first level flight plan data; and
   responsive to receiving the selection of the portion of the first level flight plan data, displaying second level flight plan data, wherein the second level flight plan data displayed is used to derive the selected portion of the first level flight plan data selected by the user input.

2. The computer implemented method of claim 1 further comprising:
   receiving a change to a portion of the second level flight plan data;
   responsive to receiving the change, updating the selected portion of the first level flight plan data derived from changes to portion of the second level flight plan data to form an updated portion of the first level flight plan data; and
   presenting the updated portion of the first level flight plan data.

3. The computer implemented method of claim 1 further comprising:
   receiving user input for a selection of a portion of the second level flight plan data; and
   responsive to receiving the selection of the portion of the second level flight plan data, displaying third level flight plan data, wherein the third level flight plan data displayed is used to derive the selected portion of the second level flight plan data selected by the user input.

4. The computer implemented method of claim 1, wherein the first level flight plan data is selected from one of fuel remaining after a flight is completed, magnetic course/heading, ground speed and true air speed, estimated time en route and estimated time of arrival, and climb and descent angles.

5. The computer implemented method of claim 1, wherein the first level flight plan data and the second level flight plan data are displayed using nodes in a tree structure.

6. A computer readable storage medium storing a computer program product comprising:
   a computer usable medium having computer usable program code for displaying flight plan data, the computer program product comprising:
   computer usable program code for displaying first level flight plan data comprising a value, a calculation to derive the value, and a description of the value for the first level flight plan data;
   computer usable program code for receiving user input for a selection of a portion of the first level flight plan data; and
   computer usable program code for responsive to receiving the selection of the portion of the first level flight plan data, displaying second level flight plan data, wherein the second level flight plan data displayed is used to derive the selected portion of the first level flight plan data selected by the user input.

7. The computer program product of claim 6 further comprising:
   computer usable program code for receiving a change to a portion of the second level flight plan data;
   computer usable program code for responsive to receiving the change, updating the selected portion of the first level flight plan data derived from changes to portion of the second level flight plan data to form an updated portion of the first level flight plan data; and
   computer usable program code for presenting the updated portion of the first level flight plan data.

8. The computer program product of claim 6 further comprising:
   computer usable program code for receiving user input for a selection of a portion of the second level flight plan data; and
   computer usable program code responsive to receiving the selection of the portion of the second level flight plan data, displaying third level flight plan data, wherein the third level flight plan data displayed is used to derive the selected portion of the second level flight plan data selected by the user input.

9. The computer program product of claim 6, wherein the first level flight plan data is selected from one of fuel remaining after a flight is completed, magnetic course/heading, ground speed and true air speed, estimated time en route and estimated time of arrival, and climb and descent angles.

10. The computer program product of claim 6, wherein the first level flight plan data and the second level flight plan data are displayed using nodes in a tree structure.

11. A data processing system comprising:
    a bus;
    a communications unit connected to the bus;
    a storage device connected to the bus, wherein the storage device includes computer usable program code; and
    a processor unit connected to the bus, wherein the processor unit executes the computer usable program to display first level flight plan data comprising a value, a calculation to derive the value, and a description of the value for the first level flight plan data; receive user input for a selection of a portion of the first level flight plan data; display second level flight plan data in response to receiving the selection of the portion of the first level flight plan data, wherein the second level flight plan data displayed is used to derive the selected portion of the first level flight plan data selected by the user input.

12. The data processing system of claim 11 the processor unit further executes the computer usable program code to receive a change to a portion of the second level flight plan data; update the selected portion of the first level flight plan data derived from changes to portion of the second level flight plan data to form an updated portion of the first level flight plan data in response to receiving the change; and present the updated portion of the first level flight plan data.

13. The data processing system of claim 11 wherein the processor unit further executes the computer usable program code to receive user input for a selection of a portion of the second level flight plan data; and wherein in response to receiving the selection of the portion of the second level flight plan data, displaying third level flight plan data, wherein the third level flight plan data displayed is used to derive the selected portion of the second level flight plan data selected by the user input.

14. The data processing system of claim 11, wherein the first level flight plan data comprises fuel remaining after a flight is completed.

* * * * *